(12) United States Patent
Weng et al.

(10) Patent No.: US 7,203,907 B2
(45) Date of Patent: Apr. 10, 2007

(54) MULTI-MODAL SYNCHRONIZATION

(75) Inventors: Jie Weng, Los Altos, CA (US); Richard Swan, Portola Valley, CA (US); Hartmut Vogler, Foster City, CA (US); Samir Raiyani, Mountain View, CA (US)

(73) Assignee: SAP Aktiengesellschaft, Walldorf (DE)

( * ) Notice: Subject to any disclaimer, the term of this patent is extended or adjusted under 35 U.S.C. 154(b) by 473 days.

(21) Appl. No.: 10/131,216

(22) Filed: Apr. 25, 2002

(65) Prior Publication Data
US 2003/0146932 A1 Aug. 7, 2003

Related U.S. Application Data

(60) Provisional application No. 60/354,324, filed on Feb. 7, 2002.

(51) Int. Cl.
*G06F 3/00* (2006.01)
(52) U.S. Cl. ............... 715/748; 709/246; 709/248; 715/728; 715/760
(58) Field of Classification Search ........... 715/727, 715/728, 716, 500.1, 760, 513
See application file for complete search history.

(56) References Cited

U.S. PATENT DOCUMENTS

| 5,734,910 | A  | 3/1998  | Corrigan et al.      |
| 5,945,989 | A  | 8/1999  | Freishtat et al.     |
| 6,012,030 | A  | 1/2000  | French-St. George et al. |
| 6,119,147 | A  | 9/2000  | Toomey et al.        |
| 6,173,266 | B1 | 1/2001  | Marx et al.          |
| 6,330,539 | B1 | 12/2001 | Takayama et al.      |
| 6,363,393 | B1 | 3/2002  | Ribitzky             |
| 6,377,913 | B1 | 4/2002  | Coffman et al.       |
| 6,501,832 | B1 | 12/2002 | Saylor et al.        |

(Continued)

FOREIGN PATENT DOCUMENTS

EP  1 100 013 A2  5/2001

OTHER PUBLICATIONS

Freire et al. Webviews: Accessing Personalized Web Content and Services, Apr. 2001, ACM Press, Proceedings of the 10th International Conference on World Wide Web, pp. 576-586.*

(Continued)

*Primary Examiner*—Tadesse Hailu
*Assistant Examiner*—Alvin Tan
(74) *Attorney, Agent, or Firm*—Fish & Richardson P.C.

(57) ABSTRACT

A first-modality gateway and a second-modality gateway are synchronized, with both gateways interfacing between a user and a server system. The synchronizing allows the user to use either of the first-modality gateway or the second-modality gateway at a given point in time to interface with specific information in the server system. A method includes accessing a communication sent from a first-modality gateway, and providing a synchronizing mechanism in response to accessing the communication. Another method includes receiving a request for a first-modality data from a first-modality entity, determining a second-modality data, and providing the second-modality data to a second-modality entity, where the second-modality data corresponds to the first-modality data. An article includes a first-modality interface, a second-modality interface, and a controller interface. The controller interface includes instructions that when executed by a machine result in interfacing the first-modality interface and the second-modality interface to a controller that provides synchronization.

8 Claims, 13 Drawing Sheets

U.S. PATENT DOCUMENTS

| | | | |
|---|---|---|---|
| 6,513,063 | B1 | 1/2003 | Julia et al. |
| 6,523,061 | B1 | 2/2003 | Halverston et al. |
| 6,745,163 | B1 | 6/2004 | Brocious et al. |
| 6,807,529 | B2 | 10/2004 | Johnson et al. |
| 6,895,558 | B1* | 5/2005 | Loveland .................... 715/746 |
| 2001/0049603 | A1 | 12/2001 | Sravanapudi et al. |
| 2002/0003547 | A1* | 1/2002 | Wang et al. ................ 345/727 |
| 2002/0194388 | A1 | 12/2002 | Boloker et al. |
| 2003/0023953 | A1 | 1/2003 | Lucassen et al. |
| 2003/0046316 | A1* | 3/2003 | Gergic et al. ............... 707/513 |
| 2003/0046346 | A1* | 3/2003 | Mumick et al. ............ 709/205 |
| 2003/0071833 | A1* | 4/2003 | Dantzig et al. ............. 345/700 |
| 2003/0140113 | A1 | 7/2003 | Balasuriya |
| 2003/0167172 | A1 | 9/2003 | Johnson et al. |
| 2003/0187944 | A1 | 10/2003 | Johnson et al. |
| 2004/0117804 | A1 | 6/2004 | Scahill et al. |
| 2005/0273759 | A1 | 12/2005 | Lucassen et al. |

OTHER PUBLICATIONS

ScanSoft, Inc., Product Listings and Descriptions for Dragon Naturally Speaking and PDsay, 2002, printed from http://www.scansoft.com/ (8 pages).

Hewlett-Packard Company, Cascaded Support Pages, 2002, printed from http://welcome.hp.com/ and linked pages (5 pages).

Hewlett-Packard Company, Customizing an Order with Pull-Down Menus, 2002, printed from http://www.hp.com and linked pages (3 pages).

Amazon.com, Inc., Search Menu for Books, 2002, printed from http://www.amazon.com (2 pages).

Dell Computer Corporation, "Dell Express Path II, Computer Finder," 2002, printed from http://www.dell.com and linked pages (2 pages).

Compaq, "Customize Your Configuration," 2002, printed from http://athome.compaq.com/ and linked pages (5 pages).

Andrew Hunt (editor), "JSpeech Grammar Format," Jun. 2000, printed from http://www.w3.org/TR/2000/NOTE-jsgf-20000605 (31 pages).

Michael Riben, M.D, Speech Recognition Tutorial, Jan. 1999, printed from http://home.nycap.rr.com/voice (50 pages).

Paaso et al., "A New Environment for Courseware Development, Course Delivery and Training", Proceedings of the ED-Media 97.

Henze et al., "Modeling Constructivist Teaching Functionality and Structure in the KBS Hyperbook System", Jun. 1999.

Jungmann et al., Adaptive Hypertext in Complex Information Spaces, Mar. 1997.

Jin et al., "An Ontology-Aware Authoring Tool-Functional Structure and Guidance Generation".

Siekmann et al., "Adaptive Course Generation and Presentation".

Albert et al., "Adaptive and Dynamic Hypertext Tutoring Systems Based on Knowledge Space Theory".

Ranwez et al., "Description and Constructon of Pedagogical Material Using an Ontology Based DTD".

Max Muhlhauser, "Cooperative Computer-Aided Authoring and Learning" 1995, Kluwer Academic Publishers.

Michael Classen, "The Voice of XML," Jun. 2001, printed from http://www.webreference.com (13 pages).

Just van den Broecke, "Pushlets: Send events from servlets to DHTML client browsers," Mar. 2000, printed from http://www.JavaWorld.com (15 pages).

Nuance Communications Inc., "Nuance 8.0 Delivers Lower Costs for Enterprises and Service Providers, Boosts Customer Satisfaction with Superior Accuracy and Personalized Caller Interactions," Jan. 2002, printed from http://www.nuance.com (4 pages).

Nuance Communications Inc., "Nuance Backs W3C for Multi-Modal Applications Standard Setting," Feb. 2002, printed from http://www.nuance.com (2 pages).

Speech Application Language Tags ("SALT") Forum, "Cisco, Comverse, Intel, Microsoft, Philips and SpeechWorks Found Speech Application Language Tags Forum to Develop New Standard For Multimodal and Telephony-Enabled Applications and Services," Oct. 2001, printed from http://www.saltforum.org (5 pages).

Speech Application Language Tags ("SALT") Forum, "The SALT Forum Welcomes Additional Technology Leaders as Contributors," Jan. 2002, printed from http://www.saltforum.org (4 pages).

Speech Application Language Tags ("SALT") Forum, "Speech Application Language Tags (SALT) Technical White Paper," printed from http://www.saltforum.org/downloads (6 pages).

Jonathan Eisenzopf, "Microsoft-led SALT Forum Releases Draft Spec," 2002, printed from http://voicexmlplanet.com/articles/saltspec.html (4 pages).

Jupitermedia Corporation, "KnowNow Debuts with Event Routing Technology," Jun. 2001, printed from http://siliconvalley.internet.com/news/print.php/793671 (2 pages).

KnowNow, Inc., "Library Listing," 2002, printed from htt/://www.knownow.com (1 page).

KnowNow, Inc., "Event Routing vs. Multicasting: Marrying Publish-Subscribe and Internet-Style Routing," 2002, printed from htt/://www.knownow.com (3 pages).

KnowNow, Inc., "Web-Standard Messaging: Using Message Routing for Fast, Simple and Affordable Integration," 2002, printed from htt/://www.knownow.com (4 pages).

KnowNow, Inc., "KnowNow Architecture Overview," 2002, printed from htt/://www.knownow.com (5 pages).

* cited by examiner

MULTI-MODAL SYNCHRONIZATION

CROSS-REFERENCE TO RELATED APPLICATIONS

This application claims priority from U.S. Provisional Application No. 60/354,324, filed Feb. 7, 2002, and titled MOBILE APPLICATION ARCHITECTURE, which is hereby incorporated by reference in its entirety for all purposes.

TECHNICAL FIELD

Particular implementations relate generally to synchronization of multiple modes of communication, and more particularly to such synchronization as applied to mobile devices.

BACKGROUND

A user may interface with a machine in many different modes, such as, for example, a mechanical mode, an aural mode, and a visual mode. A mechanical mode may include, for example, using a keyboard for input. An aural mode may include, for example, using voice input or output. A visual mode may include, for example, using a display output. When using a computer to access data over the World-Wide Web ("WWW") a browser may be used, which generally allows a keyboard, a mouse, or a stylus to be used for input and a display to be used for output. Alternatively, voice input and output can be used to access data over the WWW.

SUMMARY

In one aspect, a first-modality gateway and a second-modality gateway are synchronized. Both gateways interface between a user and a server system, and synchronizing allows the user to use either of the first-modality gateway or the second-modality gateway at a given point in time to interface with specific information in the server system.

A browser and a voice gateway may be synchronized, and the server system may include web pages. The first-modality gateway and a third-modality gateway may be synchronized, wherein the third-modality gateway interfaces between the user and the server system.

A first-modality page may be sent from the server system to the first-modality gateway in response to receiving at the server system an input from the first-modality gateway. A second-modality page may be determined that corresponds to the first-modality page. The second-modality page may be sent from the server system to the second-modality gateway.

Sending the first-modality page from the server system to the first-modality gateway may include a web server sending a voice extensible markup language ("VXML") page to a voice gateway in response to receiving at the web server the input from the voice gateway. Determining the second-modality page may include the web server determining a hypertext markup language ("HTML") page that corresponds to the VXML page. Sending the second-modality page may include the web server sending the determined HTML page to a browser. The web server may receive a refresh request from the browser before the web server sends the determined HTML page.

Sending the first-modality page from the server system to the first-modality gateway may include a web server sending a VXML page to a voice gateway in response to receiving at the web server the input from the voice gateway. Determining the second-modality page may include the web server determining a HTML page that corresponds to the VXML page. Sending the second-modality page to the second-modality gateway may include the web server sending the determined HTML page to a browser by sending the determined HTML page to a publish/subscribe system with the result that the publish/subscribe system sends the determined HTML page to the browser.

Sending the first-modality page from the server system to the first-modality gateway may include a web server sending a HTML page to a browser in response to receiving at the web server the input from the browser. Determining the second-modality page may include the web server determining a VXML page that corresponds to the HTML page. Sending the second-modality page to the second-modality gateway may include the web server sending the determined VXML page to a voice gateway by sending the VXML page to a publish/subscribe system with the result that the publish/subscribe system sends the VXML page to the voice gateway.

Sending the first-modality page from the server system to the first-modality gateway may include a web server sending a HTML page to a browser in response to receiving at the web server the input from the browser. Determining the second-modality page may include the web server determining a VXML page that corresponds to the HTML page. Sending the second-modality page to the second-modality gateway may include the web server sending the determined VXML page to a voice gateway. The web server may receive a request from the voice gateway when the voice gateway has received no voice input for a specified amount of time, and the web server may receive the request before the web server sends the determined VXML page to the voice gateway.

Synchronizing may include receiving a request for a first-modality page from the first-modality gateway, determining a second-modality page that corresponds to the first-modality page, and requesting the second-modality page. Receiving the request for the first-modality page from the first-modality gateway may include a controller receiving the request for a HTML page from a browser, the controller being physically separate from the browser. Determining the second-modality page may include the controller determining a VXML page that corresponds to the HTML page. Requesting the second-modality page may include the controller requesting the determined VXML page from a voice gateway, the controller being physically separate from the voice gateway and from the server system.

Receiving the request for the first-modality page from the first-modality gateway may include a controller receiving the request for a VXML page from a voice gateway, the controller and the voice gateway residing on a mobile device. Determining the second-modality page may include the controller determining a HTML page that corresponds to the VXML page. Requesting the second-modality page may include the controller requesting the determined HTML page from a web server.

Synchronizing may include receiving a request for a first-modality page from the first-modality gateway, determining a second-modality page that corresponds to the first-modality page, and sending an identifier of the second-modality page to the second-modality gateway. Receiving the request for the first-modality page from the first-modality gateway may include a controller receiving the request for a HTML page from a browser, the controller and the browser residing on a mobile device. Determining a second-modality page may include the controller determining a VXML page that corresponds to the HTML page. Sending an identifier of the second-modality page to the second-modality gateway may include the controller sending a uniform resource locator ("URL") of the determined VXML page to a voice gateway, the voice gateway residing on the mobile device.

Synchronizing may include receiving a request for a first-modality page from a first-modality interface, accessing an identifier of a second-modality page where the second-modality page corresponds to the first-modality page, and requesting the second-modality page. Receiving the request for the first-modality page from the first-modality interface may include a controller receiving the request for a VXML page from a voice interface, the controller being physically separate from the voice interface. Accessing the identifier of the second-modality page may include the controller accessing a URL for a HTML page that corresponds to the VXML page, wherein the URL is supplied by a voice gateway that is physically separate from the controller. Requesting the second-modality page may include the controller requesting the corresponding HTML page for a browser from a web server, the controller being physically separate from the web server and the browser.

Synchronizing the first-modality gateway and the second-modality gateway may include receiving from a first-modality interface a first item relating to first data, and determining second data, the second data corresponding to the first data. Receiving from the first-modality interface the first item relating to first data may include a controller receiving from a voice interface a request for a VXML page, the first item comprising the request and the first data comprising the VXML page, the controller being physically separate from the voice interface. Determining second data, the second data corresponding to the first data, may include the controller determining a HTML page that corresponds to the VXML page. The controller may request the determined HTML page for a browser from a web server, the controller being physically separate from the browser and the web server. The second data may be provided to the second-modality interface.

Receiving the first item may include receiving a request for a first web page, the first web page being identified by a first uniform resource locator ("URL") and the first data including the first URL. Determining the second data may include determining a second URL for a second web page, the second web page corresponding to the first web page, and the second data including the second URL.

Synchronizing the first-modality gateway and the second-modality gateway may include receiving from the first-modality gateway a first item relating to a first data, and determining a second data, the second data corresponding to the first data. A controller may receive the first item, and the controller may determine the second data. The second data may be provided to the second-modality gateway. The second data may be provided to the second-modality gateway after waiting for the second-modality gateway to request the second data. The second-modality gateway may be notified to request the second data. Notifying the second-modality gateway may include a controller notifying the second-modality gateway through a publish/subscribe system, and the controller may provide the second data. Notifying the second-modality gateway may include a controller notifying the second-modality gateway by sending a refresh inquiry response, and providing the second data may include a controller providing the second data.

An identifier of the second data may be maintained. The second-modality gateway may be provided a pointer to the identifier of the second data. The second data may be requested from the server system. Requesting the second data from the server system may include a controller requesting the second data from a storage medium that is local with respect to the controller, wherein the server system includes the storage medium. Requesting the second data from the server system may include a controller requesting the second data from a storage medium that is remote with respect to the controller, wherein the server system includes the storage medium. An identifier of the second data may be provided to the second-modality gateway. Determining the second data may include receiving an identifier of the second data from the first-modality gateway.

In another aspect, a communication sent from a first-modality gateway is accessed, and a synchronizing mechanism is provided in response to accessing the communication. The synchronizing mechanism is capable of use in synchronizing the first-modality gateway and a second-modality gateway, and both gateways interface between a user and a server system. Accessing a communication may include receiving a request for a first item, and providing a synchronizing mechanism may include determining a second item that corresponds to the first item, and sending the second item to the second-modality gateway. Accessing a communication may include receiving a request for a first item, and providing a synchronizing mechanism may include determining a second item that corresponds to the first item, determining an identifier of the second item, and sending the identifier to the second-modality gateway. Accessing a communication may include receiving an item, and providing a synchronizing mechanism may include determining the identity of the second-modality gateway, and sending the item to the second-modality gateway. Receiving an item may include receiving a text entry entered by a user.

In another aspect, a request for a first-modality data from a first-modality entity is received, a second-modality data is determined where the second-modality data corresponds to the first-modality data, and the second-modality data is provided to a second-modality entity. The first-modality entity may include a first-modality gateway, and the second-modality entity may include a second-modality gateway.

In another aspect, a storage medium has stored thereon instructions that when executed by a machine result in synchronizing a first-modality gateway and a second-modality gateway. Both gateways are adapted to interface between a user and a server system. The synchronizing allows the user to use either of the first-modality gateway or the second-modality gateway at a given point in time to interface with specific information in the server system. A first-modality interface may be adapted to be coupled to the first-modality gateway, and a second-modality interface may be adapted to be coupled to the second-modality gateway.

In another aspect, a controller interface includes instructions that when executed by a machine result in interfacing a first-modality interface and a second-modality interface to a controller that provides synchronization of the first-modality interface and the second-modality interface. The first-modality interface may include a browser interface.

In another aspect, one or more components implemented in hardware, firmware, or software, are adapted to receive a request for a first-modality page from a first-modality gateway, to determine a second-modality page that corresponds to the first-modality page, and to request the second-modality page. The first-modality gateway may include a browser, and the second modality gateway may include a voice gateway. Advantages of the implementations described may include: (i) allowing a user to use multiple modalities to interface with data over a network such as, for example, the WWW, (ii) enabling such multiple modality use in a mobile device, (iii) allowing such a mobile device to be designed without incorporating the synchronization functionality, (iv) enabling a web server design to remain relatively constant by performing the synchronization functionality in an intermediary between a user device and the server, (v) enabling a distributed architecture that can synchronize multiple devices, (vi) enabling multi-modal interactions that require minimum installation time, or even zero-install time at a client device, such as, for example, a personal digital assistant, and (vii) providing synchronization of multiple modalities using existing standards-based representation of data content, such as, for example, HTML and VXML.

The details of one or more implementations are set forth in the accompanying drawings and the description below. Other features, objects, and advantages of particular implementations will be apparent from the description, the drawings, and the claims.

DETAILED DESCRIPTION

Introduction to a Particular Implementation

According to an implementation, discussed more fully with respect to FIG. 2 below, a user may use multiple modes to interface to the WWW. For example, a user may use a browser and, at the same time, use aural input and output. The aural interface and the browser can be synchronized, thereby allowing the user to choose whether to use the browser or voice for a particular input. The implementation may remain synchronized by updating both the browser and a voice gateway with corresponding data. For example, when a user clicks on a link the browser will display the desired web page and the voice gateway will receive the corresponding voice-based web page so that the user can receive voice prompts corresponding to the displayed page, and so that the user can enter voice input corresponding to the displayed page.

Centralized Implementations

Figure 1:
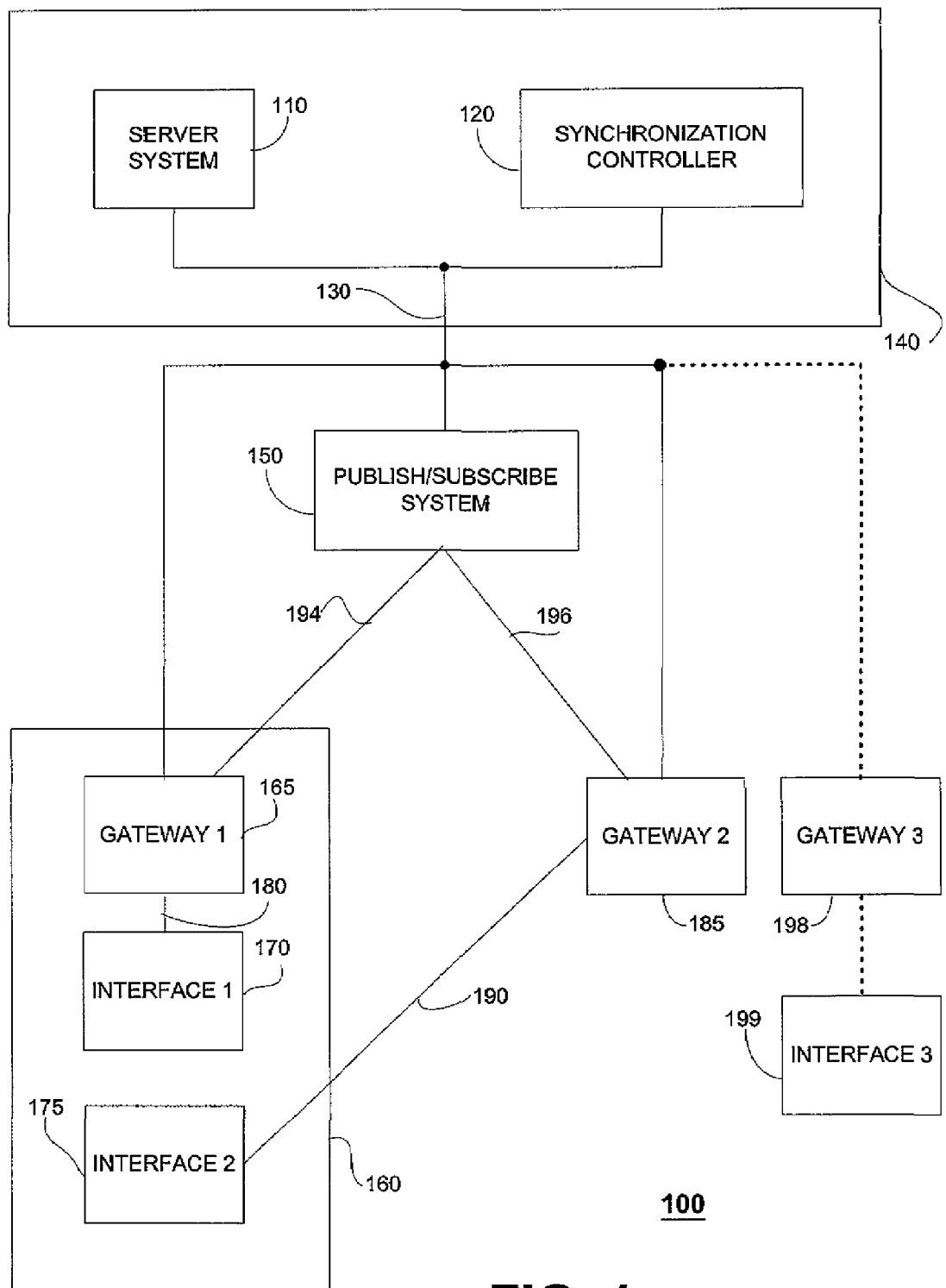
FIG. 1 is an example of a centralized system for synchronizing multiple modes.

Referring to FIG. 1, a system 100 for synchronizing multiple modes includes a server system 110 and a synchronization controller 120 that may communicate with each other over a connection 130 and are included in a common unit 140. The server system 110 and/or the synchronization controller 120 may communicate with a publish/subscribe system 150 over the connection 130.

The system 100 includes a device 160. The device 160 includes a first gateway 165, a first interface 170, and a second interface 175. The first gateway 165 and the first interface 170 may communicate over a connection 180. The system 100 includes a second gateway 185 that may communicate with the second interface 175 over a connection 190. Either or both of the first and second gateways 165, 185 may communicate with either the server system 110 and/or the synchronization controller 120 over the connection 130. The first and second gateways may communicate with the publish/subscribe system 150 over connections 194, 196 respectively.

An "interface" refers to a component that either accepts input from a user or provides output to a user. Examples include a display, a printer, a speaker, a microphone, a touch screen, a mouse, a roller ball, a joystick, a keyboard, a temperature sensor, a light sensor, a light, a heater, an air quality sensor such as a smoke detector, and a pressure sensor. A component may be, for example, hardware, software, or a combination.

A "gateway" refers to a component that translates between user input/output and some other data format. For example, a browser is a gateway and it translates the user's clicks and typing into hypertext transfer protocol ("HTTP") messages, and translates received HTML into a format that the user can understand.

The system 100 optionally includes a third gateway 198 and a third interface 199. The third gateway optionally communicates directly with the unit 140 over the connection 130. The third gateway 198 represents the multiplicity of different modes that may be used in different implementations, and the fact that the gateways and interfaces for these modes may be remote from each other and from the other gateways and interfaces. Examples of various modes of input or output include manual, visual (for example, display or print), aural (for example, voice or alarms), haptic, pressure, temperature, and smell. Manual modes may include, for example, keyboard, stylus, keypad, button, mouse, touch (for example, touch screen), and other hand inputs.

A modality gateway or a modality interface refers to a gateway (or interface) that is particularly adapted for a specific mode, or modes, of input and/or output. For example, a browser is a modality gateway in which the modality includes predominantly manual modes of input (keyboard, mouse, stylus), visual modes of output (display), and possibly aural modes of output (speaker). Thus, multiple modes may be represented in a given modality gateway. Because a system may include several different modality gateways and interfaces, such gateways and interfaces are referred to as a first-modality gateway, a first-modality interface, a second-modality gateway, a second-modality interface, etc.

More broadly, a first-modality entity refers to a component that is particularly adapted for a specific mode, or modes, of input and/or output. A first-modality entity may include, for example, a first-modality gateway or a first-modality interface.

A first-modality data item refers to a data item that is used by a first-modality entity. The data item need not be provided in one of the modes supported by the first-modality entity, but rather, is used by the first-modality entity to interface with the user in one of the supported modes. For example, if a voice gateway is a first-modality gateway, then a first-modality data item may be, for example, a VXML page. The VXML is not itself voice data, but can be used to provide a voice interface with a user.

Figure 2:
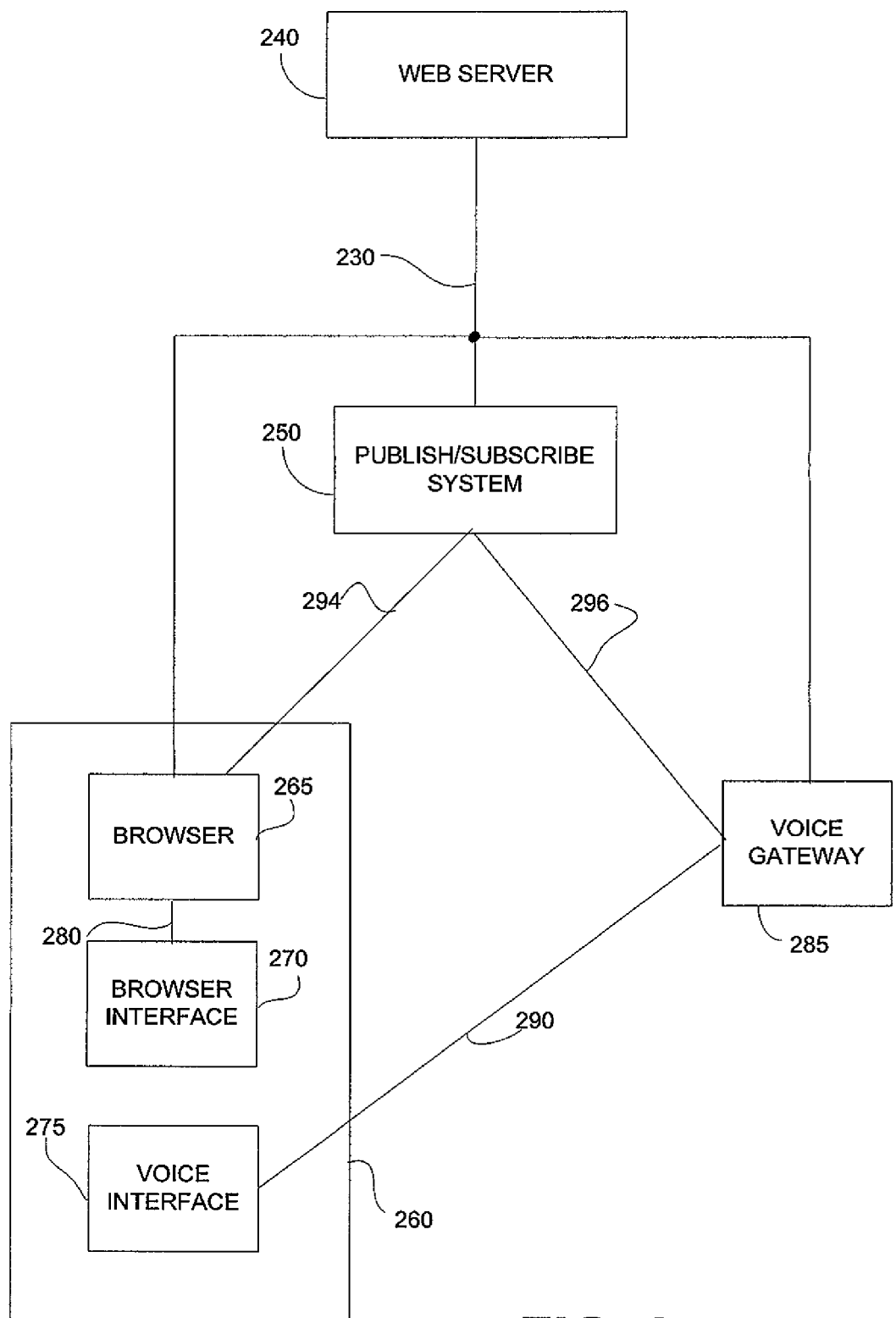
FIG. 2 is an example of an implementation of the system of FIG. 1.

Referring to FIG. 2, a system 200 is one example of an implementation of the system 100. The control unit 140 is implemented with a web server 240 that includes a synchronization controller (see 120). The first gateway 165 and the first interface 170 are implemented with a browser 265 and a browser interface 270, respectively. The second gateway 185 and the second interface 175 are implemented with a voice gateway 285 and a voice interface 275, respectively. The device 160 is implemented with a device 260 that may be, for example, a computer or a mobile device. A publish/subscribe system 250 is analogous to the publish/subscribe system 150. Connections 230, 280, 290, 294, 296 are analogous to the connections 130, 180, 190, 194, 196.

The voice interface 275 may include, for example, a microphone and a speaker. The voice interface 275 may be used to send voice commands to, and receive voice prompts from, the voice gateway 285 over the connection 290. The commands and prompts may be transmitted over the connection 290 using, for example, voice telephony services over an Internet protocol ("IP") connection (referred to as voice over IP, or "VoIP"). The voice gateway 285 may perform the voice recognition function for incoming voice data. The voice gateway 285 may also receive VXML pages from the web server 240 that include dialogue entries for interacting with the user using voice. The voice gateway 285 may correlate recognized words received from the user with the dialogue entry to determine how to respond to the user's input. Possible responses may include prompting the user for additional input or executing a command based on the user's input.

The browser 265 operates in an analogous manner to the voice gateway 285. However, the browser 265 uses HTML pages rather than VXML pages. Also, the browser 265 and the user often communicate using manual and visual modes such as, for example, a keyboard, a mouse and a display, rather than using voice. Although the browser 265 may be capable of using an aural mode, it is generally restricted to output, such as, for example, providing music over a speaker. Although the system 200 shows an implementation tailored to the modes of manual and voice input, and display and voice output, alternative and additional modes may be supported.

The publish/subscribe system 250 may function, for example, as a router for subscribed entities. For example, if the gateways 265, 285 are subscribed, then the publish/subscribe system 250 may route messages from the web server 240 to the gateways 265, 285.

The operation of the system 200 is explained with reference to FIGS. 3–6 that depict examples of processes that may be performed using the system 200. Four such processes are described, all dealing with synchronizing two gateways after a user has navigated to a new page using one of the two gateways. The four processes are: server push, browser pull, voice-interrupt listener, and no-input tag.

Figure 3:
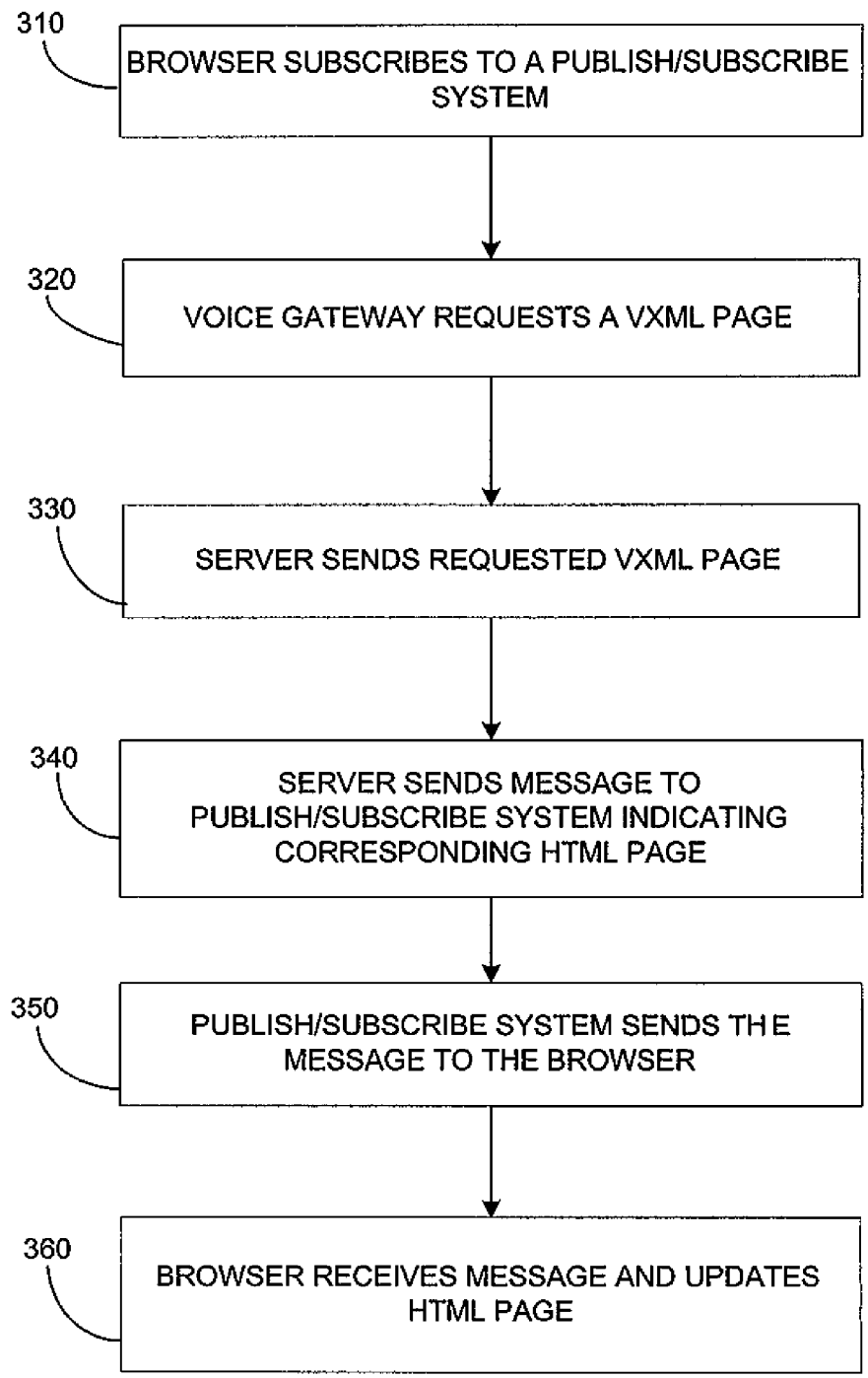
FIG. 3 is an example of a server-push process for synchronizing a browser after a voice gateway requests a VXML page.

Referring to FIG. 3, a process 300, referred to as server push, for use with the system 200 includes the browser 265 subscribing to the publish/subscribe system 250 (310). Subscription may be facilitated by the web server 240 inserting a function call into an HTML page. When the browser 265 receives and loads the page, the function call is executed and posts a subscription to the publish/subscribe system 250. The subscription includes a call-back pointer or reference, which is inserted into the subscription so that upon receiving a published message the publish/subscribe system 250 can provide the message to the browser 265. After subscribing, the browser 265 then listens to the publish/subscribe system 250 for any messages. In one implementation, the browser 265 uses multiple frames including a content frame, a receive frame, and a send frame. The send frame is used to subscribe. The receive frame is used to listen. And the content frame is the only frame that displays content. Subscription (310) maybe delayed in the process 300, but occurs before the browser 265 receives a message (see 350).

The process 300 includes the voice gateway 285 requesting a VXML page (320), and the web server 240 sending the VXML page to the voice gateway 285 (330). Note that the browser 265 and the voice gateway 285 are the gateways to be synchronized in the implementation of the process 300 being described. The operations 320 and 330 may be initiated, for example, by a user providing a voice command to the voice gateway 285 telling the voice gateway 285 to navigate to a new web page. The web server 240 may delay sending the VXML page until later in the process 300. Such a delay might be useful to better time the arrival of the requested VXML page at the voice gateway 285 with the arrival of the corresponding HTML page at the browser 265.

A page may be, for example, a content page or a server page. A content page includes a web page, which is what a user commonly sees or hears when browsing the web. Web pages include, for example, HTML and VXML pages. A server page includes a programming page such as, for example, a Java Server Page ("JSP"). A server page may also include content.

The process 300 includes the web server 240 sending a message to the publish/subscribe system 250 indicating the HTML page that corresponds to the VXML page sent to the voice gateway 285 (340). The web server 240 may recognize, or perhaps assume, that the voice gateway 285 and the browser 265 are out of synchronization, or that the two gateways 265, 285 will become out of synchronization, due to the VXML page being sent to the voice gateway 285. Accordingly, the web server 240 sends the message to the publish/subscribe system 250, intended for the browser 265, to bring the two gateways 265, 285 into synchronization. The web server 240 may send the message by using, for example, a HTTP post message with an embedded JavaScript command that indicates the corresponding HTML page. The web server 240 need not designate the particular browser 265 for which the message is intended (by, for example, specifying an IP address and a port number). Rather, the web server 240 sends a message configured for a specific "topic" (usually a string parameter). All subscribers to that topic will receive the message when the message is published by the web server 240 via the publish/subscribe system 250.

The web server 240 may determine the corresponding HTML page in a variety of ways. For example, if the VXML page request was the voice equivalent of a click on a link, then the VXML data may contain the uniform resource locator ("URL") for the corresponding HTML page. Alternatively, for example, the web server 240 may access a database containing URLs of corresponding VXML and HTML pages, or perform a URL translation if the corresponding pages are known to have analogous URLs.

"Synchronizing," as used in this disclosure, refers to bringing two entities into synchronization or maintaining synchronization between two entities. Two gateways are said to be synchronized, for the purposes of this disclosure, when, at a given point in time, a user can use either of two modes to interface with specific information, the interfacing including either input or output.

Two items "correspond," as used in this disclosure, if they both can be used by a different modality gateway to allow a user to interface with specific information. For example, an HTML page corresponds to a VXML page if the HTML page allows the user to interface with some of the same information as does the VXML page. An item may correspond to itself if two gateways can use the item to allow a user to interface with information in the item using different modalities.

The process 300 includes the publish/subscribe system 250 receiving the message from the web server 240 and sending the message to the browser 265 (350). The publish/subscribe system 250 may use another HTTP post message to send the message to all subscribers of the specified topic. In such an implementation, the publish/subscribe system 250 may utilize a call-back pointer or reference that may have been inserted into the subscription from the browser 265.

The process 300 includes the browser 265 receiving the message (360). The browser 265 is assumed to be in a streaming HTTP mode, meaning that the HTTP connection is kept open between the browser 265 and the publish/subscribe system 250. Because the browser 265 is subscribed, a HTTP connection is also kept open between the publish/subscribe system 250 and the web server 240. The web server 240 repeatedly instructs the browser 265, through the publish/subscribe system 250, to "keep alive" and to continue to display the current HTML page. These "keep alive" communications are received by the receive frame of the browser 265 in an interrupt fashion. When the web server message arrives indicating the corresponding HTML page, the browser 265 receives the message in the browser receive frame and executes the embedded JavaScript command. Executing the command updates the content frame of the browser 265 by redirecting the content frame to another HTML page.

Figure 4:
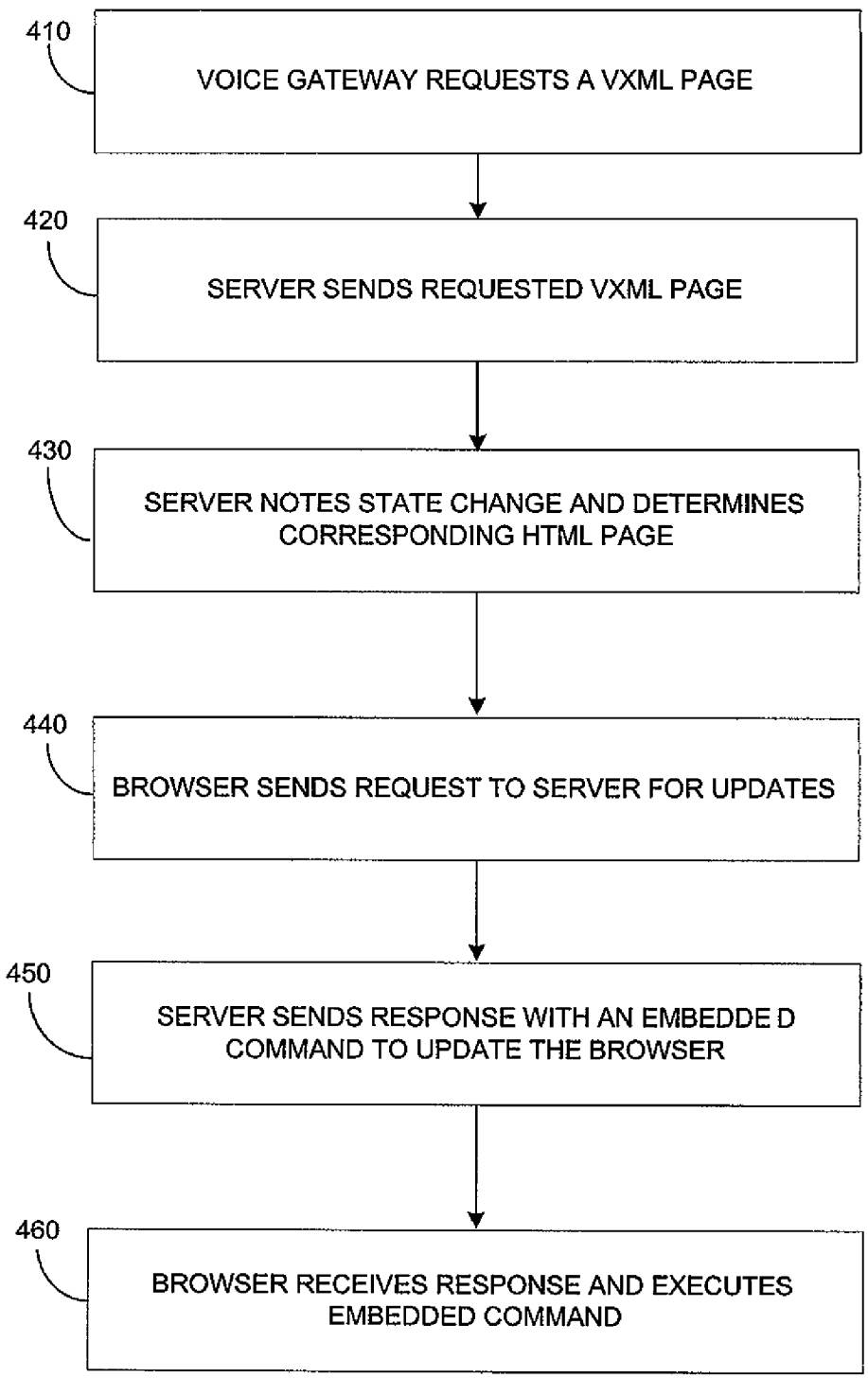
FIG. 4 is an example of a browser-pull process for synchronizing a browser after a voice gateway requests a VXML page.

Referring to FIG. 4, a process 400, referred to as browser pull, for use with the system 200 includes the voice gateway 285 requesting a VXML page (410), and the web server 240 sending the requested VXML page to the voice gateway 285 (420). The web server 240 may delay sending the VXML page until later in the process 400 in order, for example, to better time the arrival of the requested VXML page at the voice gateway 285 with the arrival of the corresponding HTML page at the browser 265.

The process 400 includes the web server 240 noting that the state of the voice gateway 285 has changed and determining the corresponding page that the browser 265 needs in order to remain synchronized (430). The web server 240 thus tracks the state of the gateways 265, 285.

The process 400 includes the browser 265 sending a request to the web server 240 for any updates (440). The requests are refresh requests or requests for updates, and the browser 265 sends the requests on a recurring basis from a send frame using a HTTP get message.

The process 400 includes the web server 240 sending a response to update the browser 265 (450). Generally, the web server 240 responds to the refresh requests by sending a reply message to the browser receive frame indicating "no change." However, when the voice gateway 285 has requested a new VXML page, the web server 240 embeds a JavaScript command in the refresh reply to the browser 265 that, upon execution by the browser 265, will result in the browser 265 coming to a synchronized state. The JavaScript command, for example, instructs the browser 265 to load a new HTML page.

The process 400 includes the browser 265 receiving the response and executing the embedded command (460). Upon executing the embedded command, the browser 265 content frame is updated with the corresponding HTML page. The command provides the URL of the corresponding page. In another implementation, the web server 240 sends a standard response indicating "no change," and instructing the browser 265 to reload the current HTML page from the web server 240. However, the web server 240 also embeds a command in the current HTML page on the web server 240, and the command indicates the corresponding HTML page. Thus, when the current HTML page is requested, received, and loaded, the browser 265 will execute the embedded command and update the HTML page.

Figure 5:
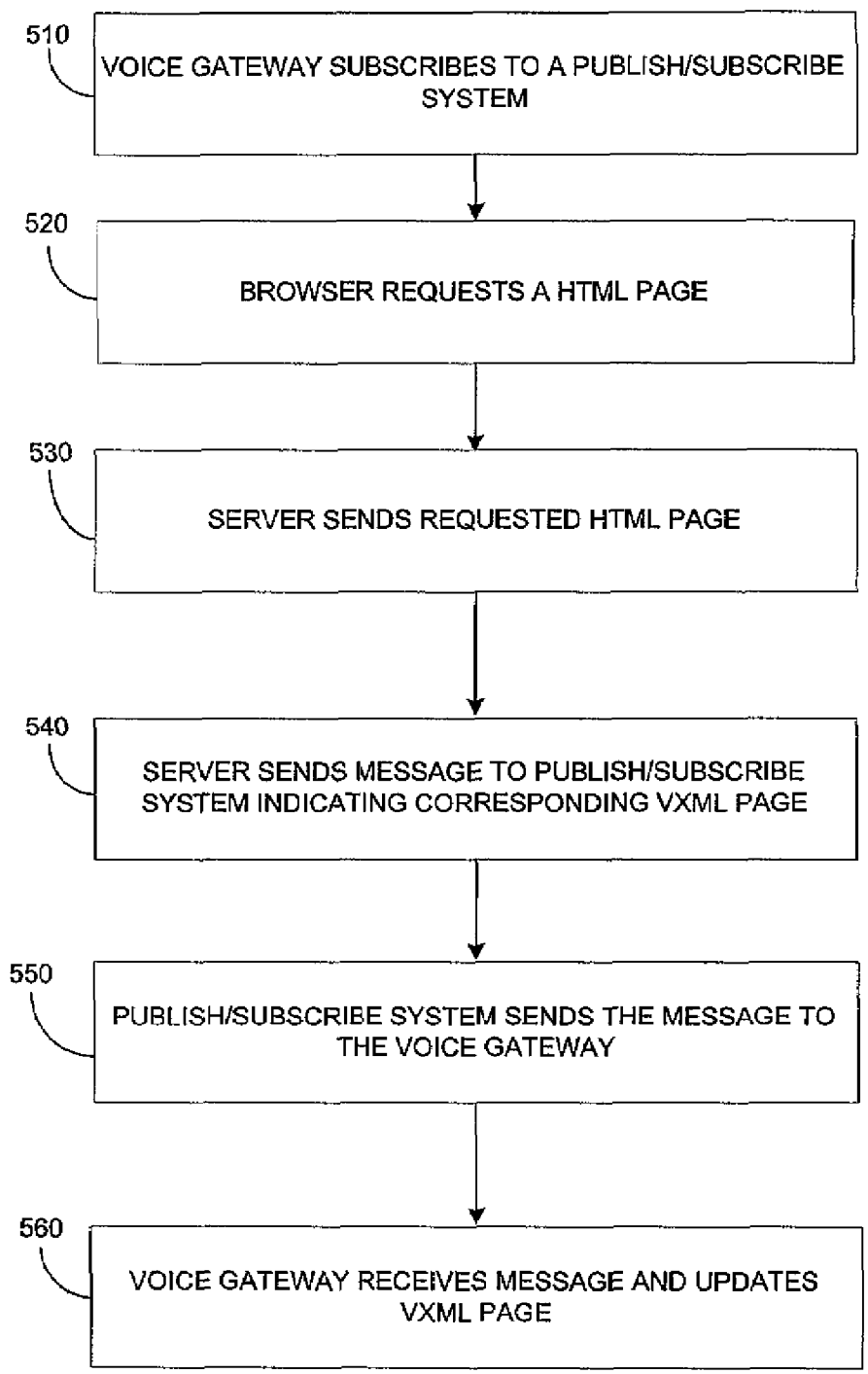
FIG. 5 is an example of a voice-interrupt listener process for synchronizing a voice gateway after a browser requests a HTML page.

Referring to FIG. 5, a process 500, referred to as voice-interrupt listener, for use with the system 200 includes the voice gateway 285 subscribing to the publish/subscribe system 250 (510). A function call maybe embedded in a VXML page received from the web server 240, and the function call may be executed by the voice gateway 285 to subscribe to the publish/subscribe system 250. The voice gateway 285 can subscribe at various points in time such as, for example, when the voice gateway 285 is launched or upon receipt of a VXML page. In contrast to a browser, the voice gateway does not use frames. Subscription (510) may be delayed in the process 500, but occurs before the voice gateway 285 receives a message (see 550).

The process 500 includes the browser 265 requesting from the web server 240 a HTML page (520) and the web server 240 sending to the browser 265 the requested HTML page (530). This may be initiated, for example, by a user selecting a new URL from a "favorites" pull-down menu on the browser 265. The web server 240 may delay sending the requested HTML page (530) until later in the process 500 in order, for example, to better time the arrival of the requested HTML page at the browser 265 with the arrival of the corresponding VXML page at the voice gateway 285.

The process 500 includes the web server 240 sending a message to the publish/subscribe system 250 indicating a corresponding VXML page (540). The web server 240 sends a HTTP post message to the publish/subscribe system 250, and this message includes a topic to which the voice gateway 285 is subscribed. The web server 240 also embeds parameters, as opposed to embedding a JavaScript command, into the message. The embedded parameters indicate the corresponding VXML page.

The process 500 includes the publish/subscribe system 250 sending the message to the voice gateway 285 (550).

The publish/subscribe system 250 may simply reroute the message to the subscribed voice gateway 285 using another HTTP post message.

The process 500 includes the voice gateway 285 receiving the message (560). The voice gateway 285 is assumed to be in a streaming HTTP mode, listening for messages and receiving recurring "keep alive" messages from the publish/subscribe system 250. When the voice gateway 285 receives the new message from the web server 240, the voice gateway 285 analyzes the embedded parameters and executes a command based on the parameters. The command may be, for example, a request for the corresponding VXML page from the web server 240.

Figure 6:
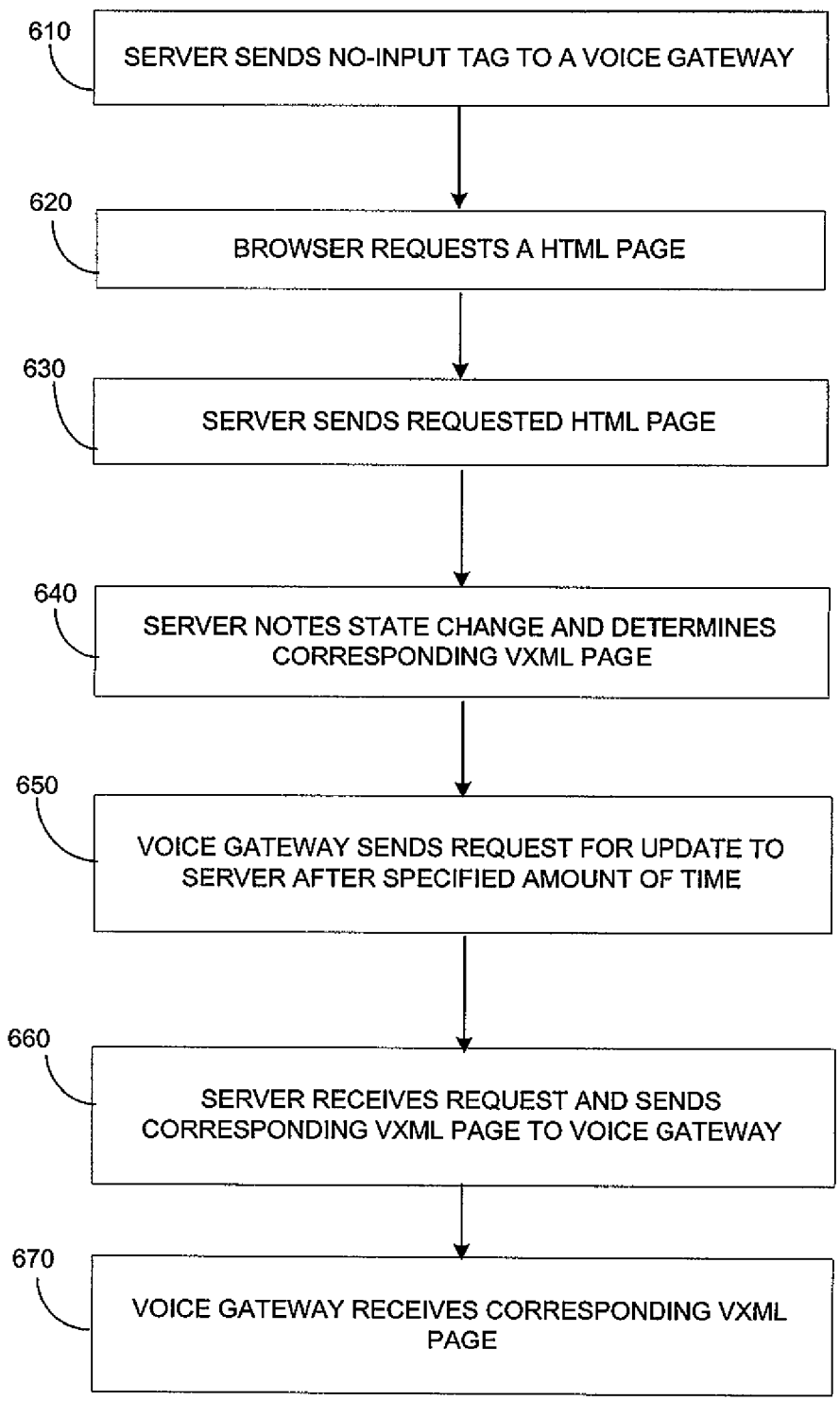
FIG. 6 is an example of a no-input tag process for synchronizing a voice gateway after a browser requests a HTML page.

Referring to FIG. 6, a process 600, referred to as no-input tag, for use with the system 200 includes the web server 240 sending the voice gateway 285 a VXML page with a no-input tag embedded (610). Every VXML page may have a no-input markup tag (<no input>) that specifies code on the voice gateway 285 to run if the voice gateway 285 does not receive any user input for a specified amount of time. The URL of a JSP is embedded in the code, and the code tells the voice gateway 285 to issue a HTTP get command to retrieve the JSP. The same no-input tag is embedded in every VXML page sent to the voice gateway 285 and, accordingly, the no-input tag specifies the same JSP each time.

The process 600 includes the browser 265 requesting a HTML page (620), the web server 240 sending the requested HTML page to the browser 265 (630), and the web server 240 noting the state change and determining a corresponding VXML page (640). The web server 240 updates the contents of the JSP, or the contents of a page pointed to by the JSP, with information about the corresponding VXML page. Such information may include, for example, a URL of the corresponding VXML page. The web server 240 may delay sending the requested HTML page (630) until later in the process 600 in order, for example, to better time the arrival of the requested HTML page at the browser 265 with the arrival of the corresponding VXML page at the voice gateway 285.

The process 600 includes the voice gateway 285 waiting the specified amount of time and sending a request for an update (650). After the specified amount of time, determined by the code on the voice gateway 285, has elapsed, the voice gateway 285 issues a HTTP get command for the JSP. When no user input is received for the specified amount of time, the user may have entered input using a non-voice mode and, as a result, the voice gateway 285 may need to be synchronized.

The process 600 includes the web server 240 receiving the update request and sending the corresponding VXML page to the voice gateway 285 (660). The JSP contains an identifier of the corresponding VXML page, the identifier being, for example, a URL or other type of pointer. The web server 240 issues a HTTP post message to the voice gateway 285 with the VXML page corresponding to the current HTML page.

The process 600 includes the voice gateway 285 receiving the corresponding VXML page (670). When the voice gateway 285 receives and loads the corresponding VXML page, and the browser 265 receives and loads the HTML (see 630), the two gateways 265, 285 are synchronized. It is possible, however, that the two gateways 265, 285 were never unsynchronized because the user did not enter a browser input, in which case the voice gateway 285 simply reloaded the current VXML page after no voice input was received during the specified amount of waiting time.

The process 600 has an inherent delay because it waits for the voice gateway 285 to ask for an update. It is possible, therefore, that the voice gateway 285 will be out of synchronization for a period of time on the order of the predetermined delay. A voice input received while the voice gateway 285 is out of synchronization can be handled in several ways. Initially, if the context of the input indicates that the gateways 265, 285 are out of synchronization, then the voice input may be ignored by the voice gateway 285. For example, if a user clicks on a link and then speaks a command for a dialogue that would correspond to the new page, the voice gateway 285 will not have the correct dialogue. Assuming a conflict, however, the web server 240 may determine that the gateways 265, 285 are not in synchronization and may award priority to either gateway. Priority may be awarded, for example, on a first-input basis or priority may be given to one gateway as a default.

Fused Implementations

Figure 7:
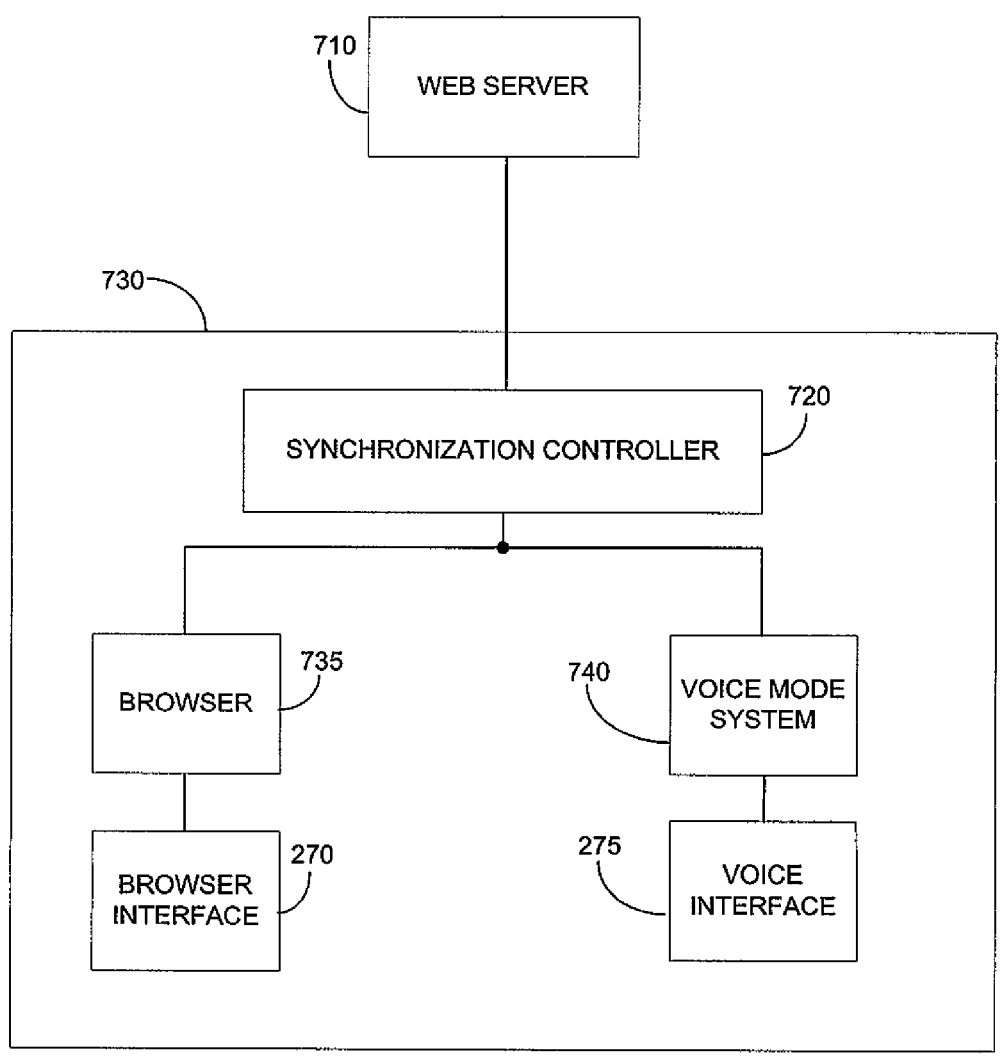
FIG. 7 is an example of a fused system for synchronizing multiple modes.

Referring to FIG. 7, a system 700 includes a web server 710 communicating with a synchronization controller 720 on a device 730. The device 730 also includes a browser 735, in communication with the browser interface 270, and a voice mode system 740 in communication with the voice interface 275.

The web server 710 may be, for example, a standard web server providing HTML and VXML pages over a HTTP connection. The device 730 may be, for example, a computer, a portable personal digital assistant ("PDA"), or other electronic device for communicating with the Internet. In one implementation, the device 730 is a portable device, allowing a user to use either browser or voice input and output, to communicate with the Internet. In such an implementation, the web server 710 does not need to be redesigned because all of the synchronization and communication is handled by the synchronization controller 720.

The voice mode system 740 stores VXML pages that are of interest to a user and allows a user to interface with these VXML pages using voice input and output. The VXML pages can be updated or changed as desired and in a variety of ways, such as, for example, downloading the VXML pages from the WWW during off-peak hours. The voice mode system 740 is a voice gateway, but is referred to as a voice mode system to note that it is a modified voice gateway. The voice mode system 740 performs voice recognition of user voice input and renders output in a simulated voice using the voice interface 275.

Figure 8:
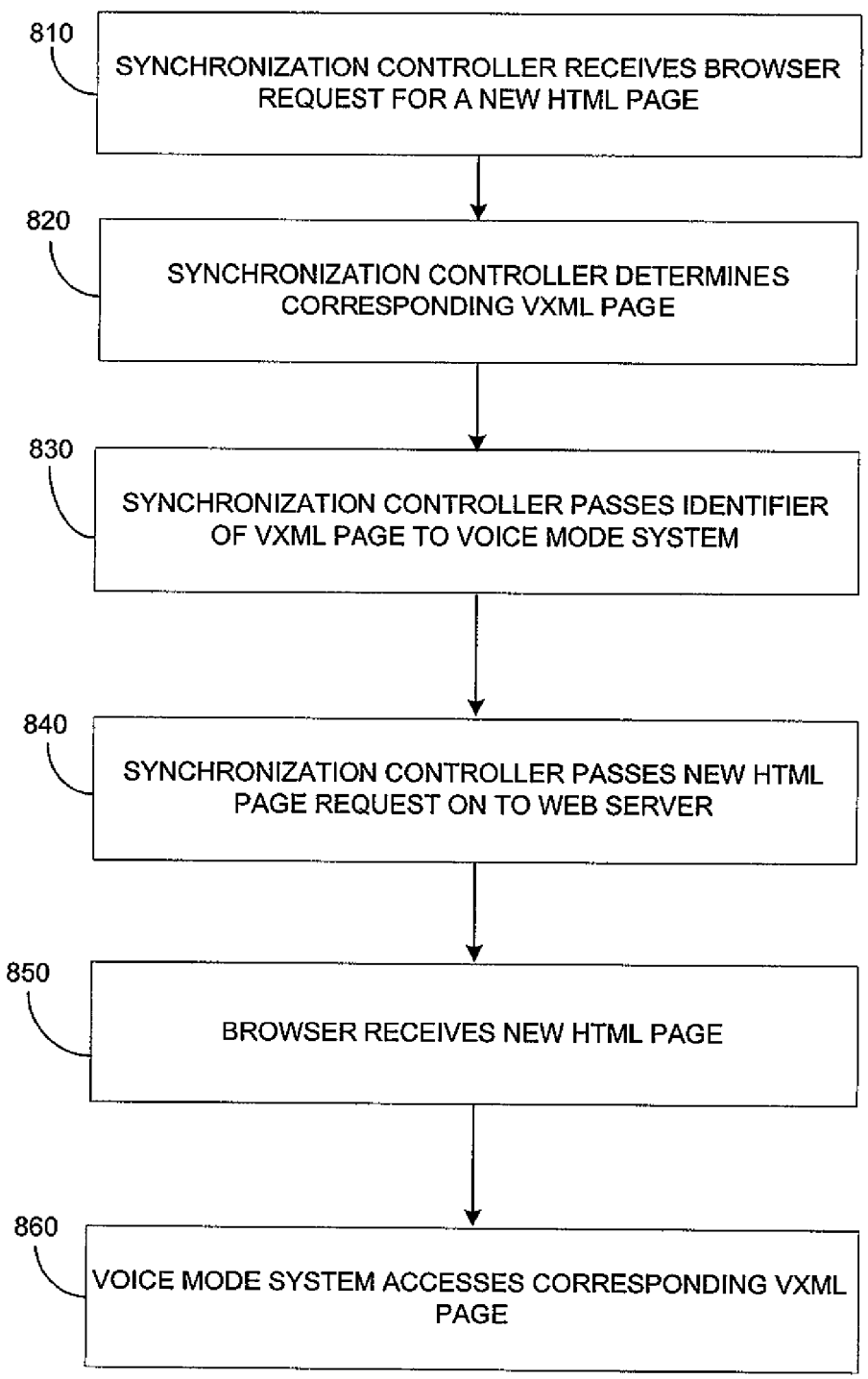
FIG. 8 is an example of a process for synchronizing a browser and a voice mode in the system of FIG. 7 after a browser input.
Figure 9:
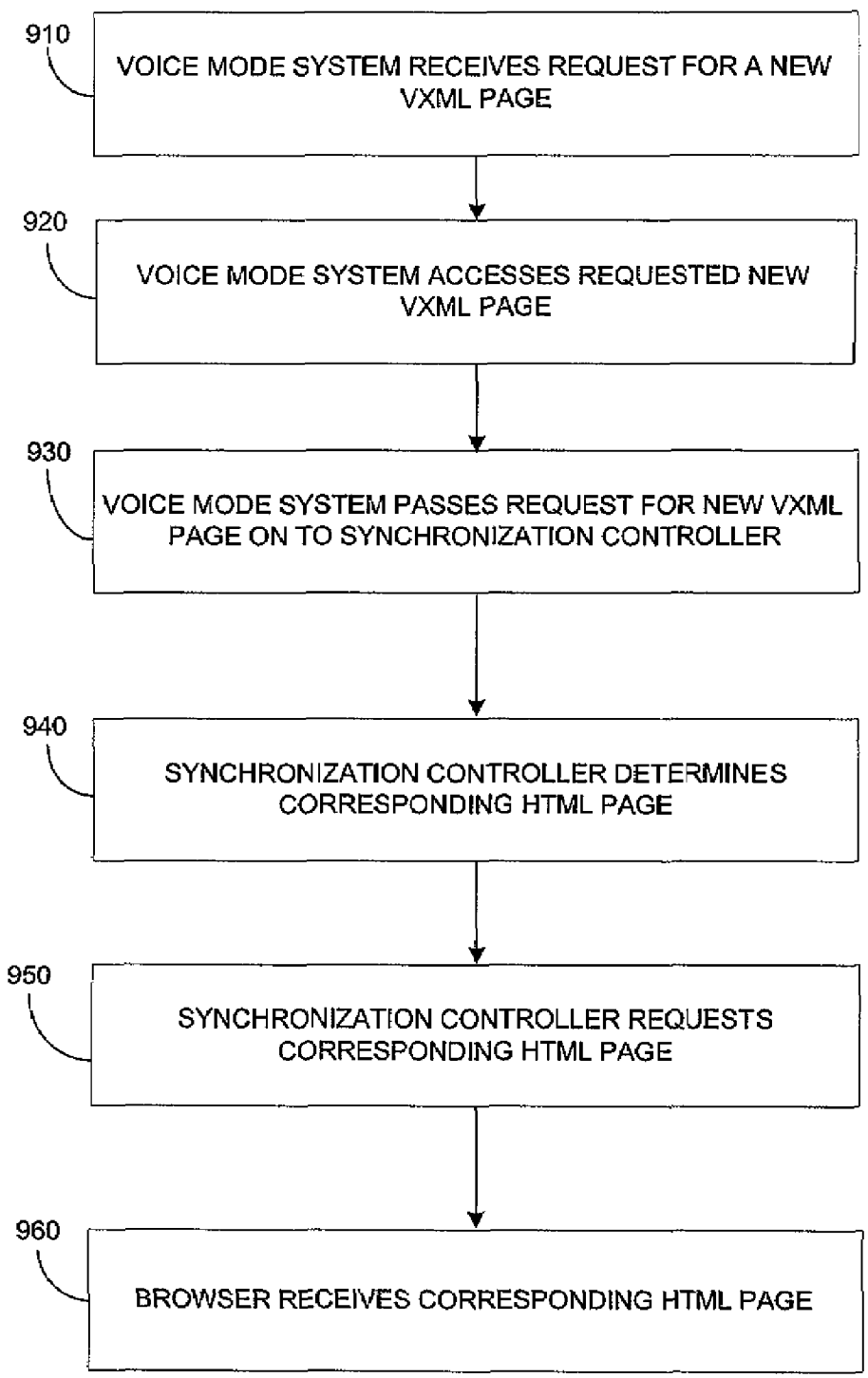
FIG. 9 is an example of a process for synchronizing a browser and a voice mode in the system of FIG. 7 after a voice input.

The synchronization controller 720 also performs synchronization between the browser and voice modes. Referring to FIGS. 8 and 9, two processes are described for synchronizing the browser 735 and the voice mode system 740, or alternatively, the browser interface 270 and the voice interface 275.

Referring to FIG. 8, a process 800 includes the synchronization controller 720 receiving a browser request for a new HTML page (810). The browser 735 may be designed to send requests to the synchronization controller 720, or the browser 735 may be sending the requests to the web server 710 and the synchronization controller 720 may be intercepting the browser requests.

The process 800 includes the synchronization controller 720 determining a VXML page that corresponds to the requested HTML page (820). In particular implementations, when the user requests a new HTML page by clicking on a link with the browser 735, the HTML data also includes the URL for the corresponding VXML page. Further, the browser 735 sends both the URL for the requested HTML page and the URL for the corresponding VXML page to the synchronization controller 720. The synchronization controller 720 determines the corresponding VXML page simply by receiving from the browser 265 the URL for the corresponding VXML page. The synchronization controller 720 may also determine the corresponding page by, for example, performing a table look-up, accessing a database, applying a translation between HTML URLs and VXML URLs, or requesting information from the web server 710.

The process 800 includes the synchronization controller 720 passing the identifier of the corresponding VXML page to the voice mode system 740 (830). The identifier may be, for example, a URL. In particular implementations, the voice mode system 740 may intercept browser requests for new HTML pages, or the browser 735 may send the requests to the voice mode system 740. In both cases, the voice mode system 740 may determine the corresponding VXML page, rather than the synchronization controller 720 determining the corresponding page (820) and sending an identifier (830).

The process 800 includes the synchronization controller 720 passing the browser's HTML page request on to the server 710 (840). The synchronization controller 720 may, for example, use a HTTP request. In implementations in which the synchronization controller 720 intercepts the browser's request, then operation 840 is performed implicitly. The synchronization controller 720 may delay sending the browser request to the server (840) until later in the process 800 in order, for example, to better time the arrival of the requested HTML page at the browser 735 with the access of the corresponding VXML page at the voice mode system 740 (see 860).

The process 800 includes the browser receiving the requested HTML page (850) and the voice mode system 740 accessing the corresponding VXML page (860). Once these two pages are loaded and available for facilitating interaction with a user, the two modes will be synchronized.

Referring to FIG. 9, a process 900 includes the voice mode system 740 receiving a user request for a new VXML page (910) and accessing the requested VXML page (920). The voice mode system 740 accesses the VXML page from, for example, stored VXML pages. Accessing the requested VXML page (920) may be delayed to coincide with the browser's receipt of the corresponding HTML page in operation 960.

The process 900 includes the voice mode system 740 passing the request for the VXML page on to the synchronization controller 720 (930), and the synchronization controller 720 determining the corresponding HTML page (940). In particular implementations, the voice mode system 740 may determine the corresponding HTML page, or may pass the request for the VXML page directly to the browser 735 with the browser 735 determining the corresponding HTML page.

The process 900 includes the synchronization controller 720 requesting the corresponding HTML page from the web server 710 (950) and the browser receiving the corresponding HTML page (960). The synchronization controller 720 may use, for example, a HTTP get command.

Proxy Implementations

Figure 10:
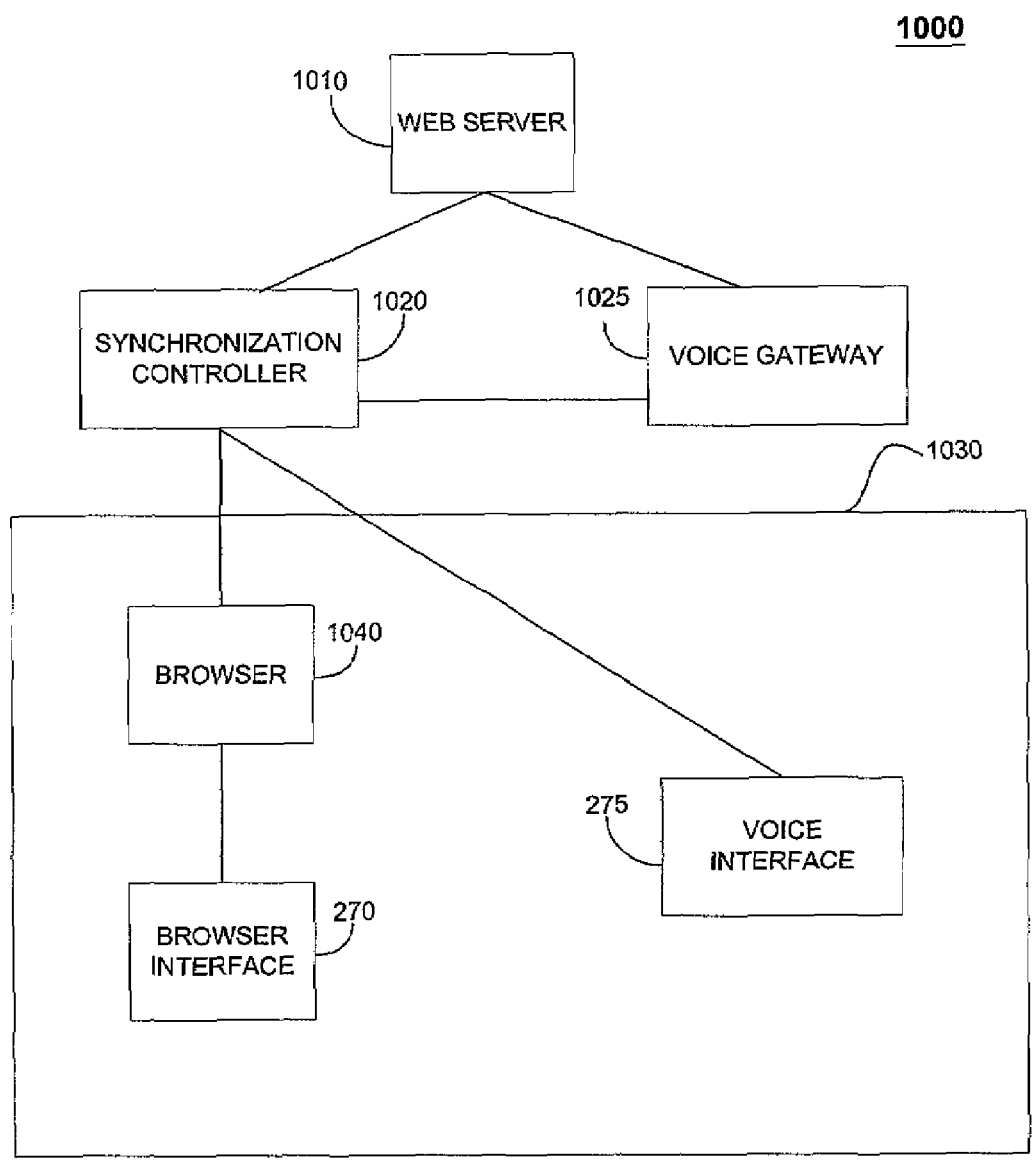
FIG. 10 is an example of a proxy system for synchronizing multiple modes.

Referring to FIG. 10, a system 1000 includes a web server 1010 communicating with both a synchronization controller 1020 and a voice gateway 1025. The synchronization controller 1020 further communicates with both the voice gateway 1025 and several components on a device 1030. The device 1030 includes the browser interface 270, a browser 1040, and the voice interface 275. The browser 1040 communicates with the browser interface 270 and the synchronization controller 1020. The voice interface 275 communicates with the synchronization controller 1020.

The web server 1010 is capable of delivering HTML and VXML pages. The device 1030 may be, for example, a computer or portable PDA that is equipped for two modes of interfacing to the WWW. The system 1000 allows the two modes to be synchronized, and the system 1000 does not require the web server 1010 to be enhanced or redesigned because the synchronization controller 1020 is independent and separate from the web server 1010.

Figure 11:
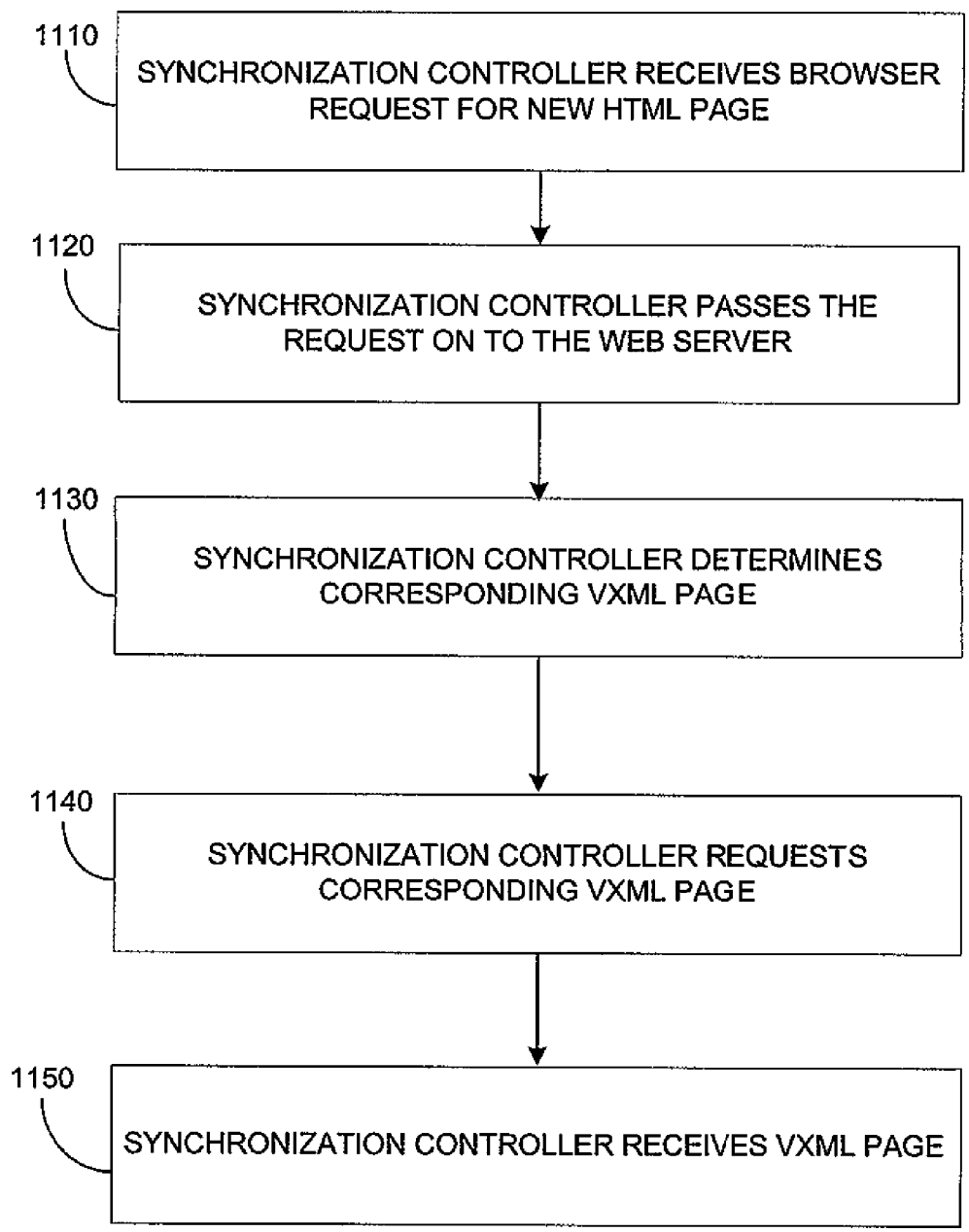
FIG. 11 is an example of a process for synchronizing a browser and a voice mode in the system of FIG. 10 after a browser input.
Figure 12:
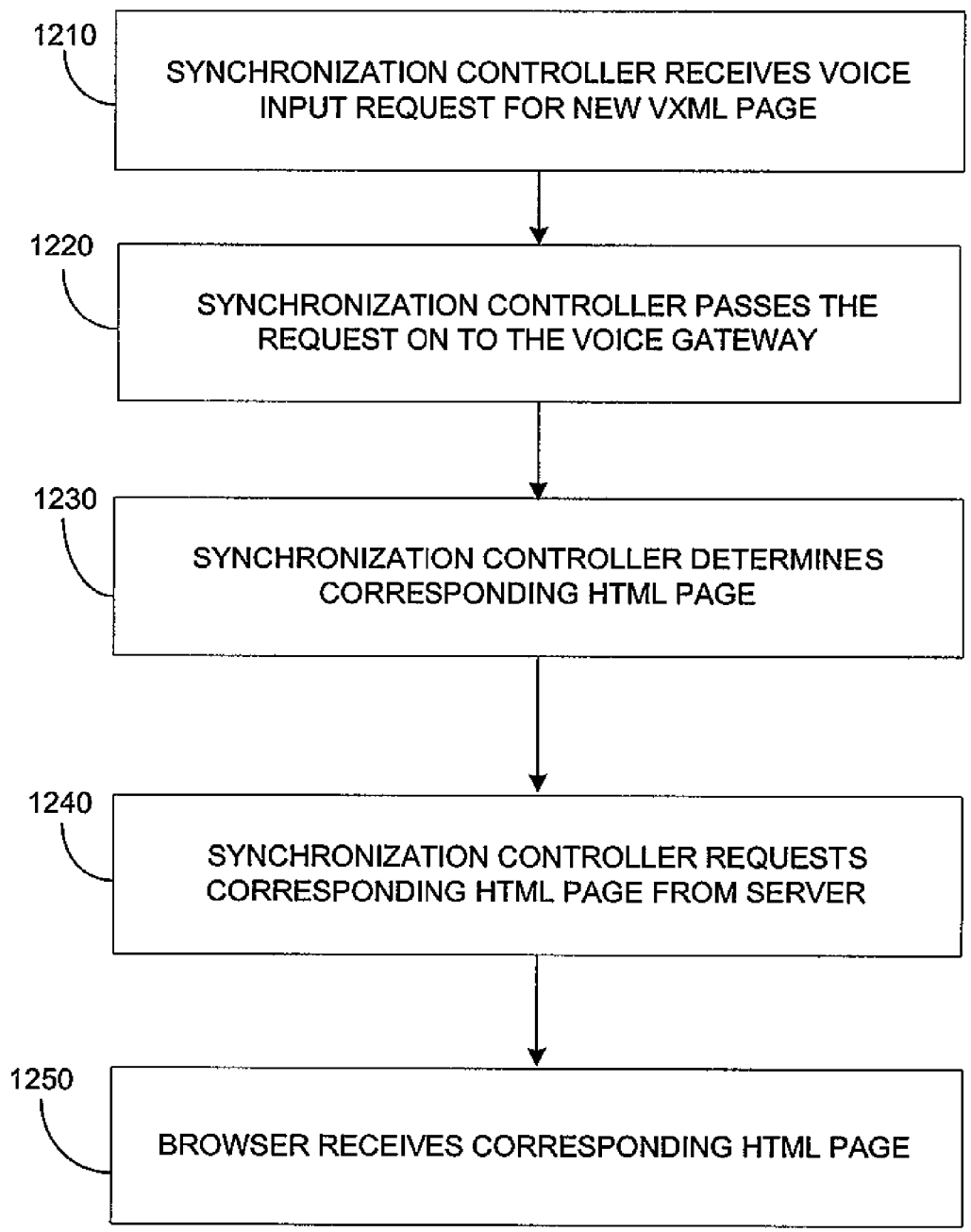
FIG. 12 is an example of a process for synchronizing a browser and a voice mode in the system of FIG. 10 after a voice input.

Referring to FIGS. 11 and 12, two processes are described for synchronizing the browser 1040 and the voice gateway 1025, or alternatively, the browser interface 270 and the voice interface 275. Both assume that the user input is a request for a new page, although other inputs may be used.

Referring to FIG. 11, a process 1100 includes the synchronization controller 1020 receiving a browser request for a new HTML page (1110). The process 1100 includes the synchronization controller 1020 passing the HTML request on to the web server 1010 (1120), and determining the corresponding VXML page (1130). These three operations 1110–1130 are substantially similar to the operations 810, 840, and 820, respectively, except for the location of the synchronization controller (compare 720 with 1120). The synchronization controller 1020 may delay sending the browser request to the web server 1010 (1120) until later in the process 1100 in order, for example, to better time the arrival of the requested HTML page at the browser 1040 with the arrival of the corresponding VXML page at the synchronization controller 1020 (see 1150).

The process 1100 includes the synchronization controller 1020 requesting the corresponding VXML page through the voice gateway 1025 (1140). The synchronization controller 1020 may request the page in various ways. For example, the synchronization controller 1020 may send a simulated voice request to the voice gateway 1025, or send a command to the voice gateway 1025.

The process 1100 includes the synchronization controller 1020 receiving the corresponding VXML page (1150). The voice gateway 1025 receives the requested VXML page and sends it to the synchronization controller 1020. In another implementation, the synchronization controller 1020 does not receive the VXML page, and the voice gateway 1025 does the voice recognition and interfacing with the user with the synchronization controller 1020 acting as a conduit.

Referring to FIG. 12, a process 1200 includes the synchronization controller 1020 receiving a voice input from the voice interface 275 requesting a new VXML page (1210). The process 1200 includes the synchronization controller (i) parsing the voice input and passing the request for a new VXML page along to the voice gateway 1025 (1220), and (ii) determining the corresponding HTML page (1230). In this implementation, the synchronization controller 1020 has access to and stores the current VXML page, which allows the synchronization controller 1020 to parse the voice input. As explained above, having the current VXML page may also allow the synchronization controller 1020 to determine the corresponding HTML page for "voice click" events. If the user's input is not the voice equivalent of clicking on a link, but is, for example, a spoken URL, then by having the capability to do the voice recognition, the synchronization controller may be able to parse the URL and request that the server provide the URL for the corresponding HTML page.

The process 1200 includes the synchronization controller 1020 requesting the corresponding HTML page from the server (1240), and the browser receiving the requested HTML page (1250). In another implementation, the synchronization controller 1020 does not determine the corresponding page, but requests that the web server 1010 determine the corresponding page and send the corresponding page.

In yet another implementation, the synchronization controller 1020 does not parse the voice input, but merely passes the VoIP request along to the voice gateway 1025. If the voice input is a request for a VXML page, the voice gateway 1025 determines the corresponding HTML page and provides the synchronization controller 1020 with a URL for the HTML page.

Figure 13:
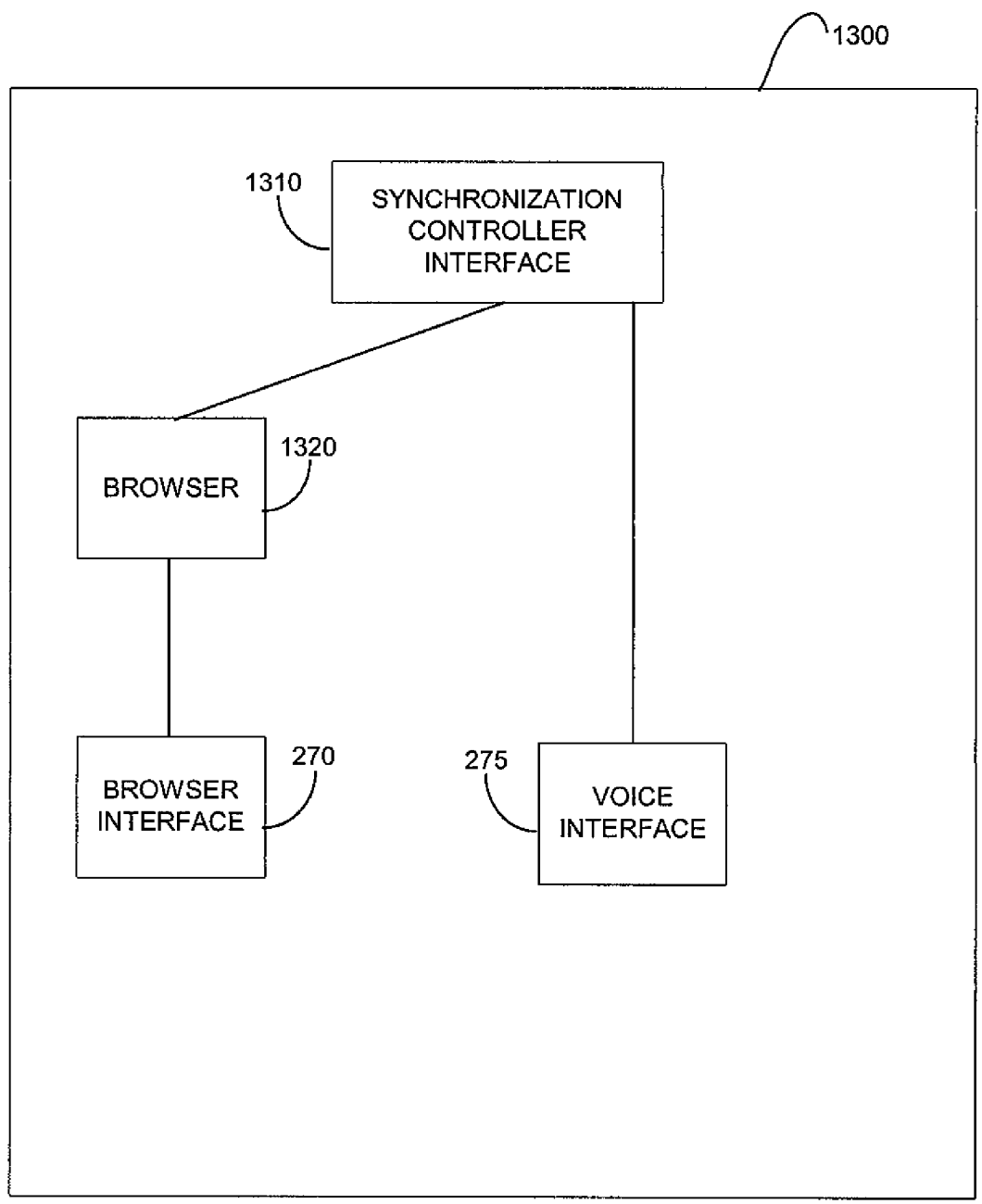
FIG. 13 is an example of a device for communicating with a synchronization controller in a proxy system for synchronizing multiple modes.

Referring to FIG. 13, a device 1300 includes a synchronization controller interface 1310, a browser 1320, the browser interface 270, and the voice interface 275. The browser 1320 communicates with the browser interface 270 and the synchronization controller interface 1310. The synchronization controller interface 1310 further communicates with the voice interface 275. The device 1300 is similar to the device 1030 except that the functionality allowing the browser 1040 and the voice interface 275 to communicate with the synchronization controller 1020 is separated as the synchronization controller interface 1310. In one implementation, the device 1300 is a mobile device. Such a mobile device is smaller and lighter than if a synchronization controller was also implemented on the mobile device. Further, because such a mobile device does not contain the functionality of a synchronization controller, but only includes an interface, the mobile device may be able to take advantage of improvements in a synchronization controller without having to be redesigned.

Additional Variations

Each of the above implementations may be used with more than two different modes. For example, inventory, shipping, or other data may be accessed in a warehouse using three different modes, and one or more machines accessing the warehouse data may need to be synchronized. The first mode may include keyboard input. The second may include voice input. And the third may include input from scanning a bar code on a pallet, for example, to request a particular record. Output for any of the modes may include, for example, display output, voice output, or printer output.

The processes described have been principally explained in terms of a particular system. However, each of the processes may be used with a variety of other implementations of a centralized, fused, proxy, or other type of system.

Referring again to FIG. 1, the server system 110 includes one or more devices for storing, at least temporarily, information that can be accessed by one or more gateways. For example, a web server has a storage device for storing web pages. The server system 110 may include multiple storage devices that are located locally or remotely with respect to each other. The server system 110 may include one or more storage devices that are located locally to another component, such as, for example, the device 160 or the second gateway 185. In various implementations, the server system 110 or the synchronization controller 120 are not contained in the unit 140.

The synchronization controller 120 maintains or establishes synchronization between two or more devices, such as, for example, gateways and/or interfaces. The components of the synchronization controller 120 may be remote or local with respect to each other and may be local to one or more of the other components in the system 100 such as, for example, the device 160, the second gateway 185, or the publish/subscribe system 150.

The publish/subscribe system 150 refers to a system that receives and sends messages. In particular implementations, the publish/subscribe system 150 can only receive messages from, or send messages to, subscribed entities—with the exception of receiving a subscribe request.

The device 160 may be an electronic device, an optical device, a magnetic device, or some other type of device capable of communicating with a user and with other systems. Examples include a computer, a PDA, a server, or a set-top box.

The connections 130, 180, 190, 194, 196, and other connections throughout the disclosure, may be direct or indirect connections, possibly with one or more intervening devices. A connection may use one or more media such as, for example, a wired, a wireless, a cable, or a satellite connection. A connection may use a variety of technologies or standards such as, for example, analog or digital technologies, packet switching, code division multiple access ("CDMA"), time division multiple access ("TDMA"), and global system for mobiles ("GSM") with general packet radio service ("GPRS"). A connection may use a variety of established networks such as, for example, the Internet, the WWW, a wide-area network ("WAN"), a local-area network ("LAN"), a telephone network, a radio network, a television network, a cable network, and a satellite network.

The processes 300–600 are amenable to numerous variations, several examples of which follow, and may be applied to architectures different than that of the system 200. Separate devices, each including one gateway, can be synchronized by keeping track of the IP addresses and port numbers of the separate devices, or by having the devices subscribe to the same topic at a publish/subscribe system. For example, a user may be operating a first-modality interface on a first machine, and operating a second-modality interface on a second machine. As another example, two or more users may be remotely located and may want to be synchronized. The remotely located users may be operating the same modality interface, or different modality interfaces.

The voice command discussed as initiating operation 320 or 410, and the browser commands discussed as initiating operation 520 or 620, may be a navigation command or a non-navigation command. Navigation commands include, for example, specifying a URL, and entering a home, back, or forward command. Non-navigation commands include, for example, a text entry, a preference change, or a focus command.

Any input received by a gateway, including command and data, may be provided to the server by the voice gateway or browser. For example, the voice gateway may provide the server with text entries and other inputs, even when the voice gateway does not need a VXML page, so that the server can supply the input to the browser to keep the browser synchronized with respect to text entries, etc., and not just with respect to new pages.

In various implementations, the server's message to a gateway in operation 360, 460, or 560 may include, for example, (i) the actual corresponding HTML/VXML page, (ii) the URL of the corresponding page with a command to retrieve the corresponding page, (iii) the URL of a JSP that identifies the corresponding page, (iv) a command relating to the corresponding page or to a JSP that identifies the corresponding page, and (v) an indication to reload the current page, into which the server has embedded a command that will retrieve the corresponding page.

A first item is said to relate to a first data when the first item includes information relating to the first data. Such information may include, for example, the first data itself, an address of the first data or some other pointer to the first data, an encoding of the first data, and parameters identifying particular information from the first data. The first data may include any of the many examples described in this disclosure as well as, for example, an address of some other data, data entered by a user, and a command entered by a user.

In sending the corresponding input, or an indication of the corresponding input, to a gateway (340–50, 450, 540–550, 660), a server may send, for example, a command or parameters. A command may include, for example, a JavaScript command that requests the corresponding page. Parameters may include, for example, a URL of the corresponding page. The parameters are parsed, a command is determined, and the command is executed. For example, in operation 660, instead of sending the corresponding VXML page, the server may send a message with parameters including a URL (for the corresponding VXML page) and an indication that the voice gateway should request the page identified by the URL.

In the processes 300–600, the web server 240 is described as performing a variety of actions. As described earlier, the web server 240 includes a synchronization controller and many of the actions performed by the web server 240 can be characterized as being performed by a synchronization controller.

Referring to FIGS. 8 and 9, operations 810 and 910 may be generalized to allow the synchronization controller 720 to receive other browser inputs, and the voice mode system 740 to receive other voice inputs. The inputs may include, for example, a command, a request for a new page, a data input, and a focus request. In one implementation of operation 910, the voice mode system 740 receives a user's city selection for a field in a VXML page that solicits the user's address. Receipt of the city selection causes the VXML to move to the dialogue entry for selecting a state. The voice mode system 740 may pass this selection to the browser 735 so that the user's screen display can be updated.

Further, the voice mode system 740 may be a voice gateway. In such an implementation, the voice gateway would not have any VXML pages stored locally and would request them from the web server 710. The synchronization controller 720 may intercept or control the voice gateway requests, analogous to the manner in which the synchronization controller 720 may intercept or control the browser requests.

One or more of the functions of the synchronization controller 720 may be performed by either the browser 735 or the voice mode system 740. For example, the browser 735 may send HTML page requests to the voice mode system 740, and the voice mode system 740 may determine the corresponding VXML page.

As indicated by the breadth of implementations disclosed, the synchronization controller can be placed at various locations within a system. Further, the component functions of a synchronization controller can be separated and placed at different locations within a system. This flexibility allows the complexity of a system to be targeted to one or more particular devices. By keeping the synchronization controller functions off of a mobile device, for example, mobile devices may be more lightweight, less expensive, and more robust to technology enhancements in the synchronization controller. By using a proxy model, a mobile device is still free of the synchronization controller, so the previous benefits may be enjoyed. Further, by using a proxy model, the multitude of existing web servers may not need to be redesigned, and the synchronization controller may allow multiple types of mobile devices to communicate with the same server infrastructure. Using a publish/subscribe system, operating as in the implementations described or according to other principles, may also facilitate an architecture with minimal install time for client devices, such that client devices are changed as little as possible.

A synchronization controller may consist of one or more components adapted to perform, for example, the functions described for a synchronization controller in one or more of the implementations in this disclosure. The components may be, for example, hardware, software, firmware, or some combination. Hardware components include, for example, controller chips and chip sets, communications chips, digital logic, and other digital or analog circuitry.

The implementations disclosed can be characterized as providing a synchronizing mechanism. Such synchronizing mechanisms include, for example, (i) sending a message to a publish/subscribe system, (ii) sending a message to a browser, possibly with a URL for a new page or a JSP, (iii) updating state information by, for example, updating a JSP, (iv) sending a corresponding page directly to a gateway, (v) requesting a corresponding page from an intermediary or from a storage location having the page, (vi) determining a corresponding page, and (vii) requesting a determination of a corresponding page, and possibly requesting receipt of that determination. Various of the listed mechanisms may be performed by a synchronization controller, a web server, a gateway, or another component adapted to provide such functionality.

Many of the disclosed implementations have focused on WWW and Internet applications. However, the features described can be applied to a variety of communication environments, networks, and systems. The use of the term "page," is also not meant to be restrictive and refers to data in a form usable by a particular gateway, interface, or other component.

Throughout this disclosure various actions are described, such as, for example, receiving, accessing, providing, sending, requesting, determining, passing, and routing. These terms, and others like them, are intended to be broadly construed. Accordingly, such terms are not restricted to acting directly but may act through one or more intermediaries. For example, a page may be sent to a gateway, provided to a gateway, or received from a gateway, even though the page may first go through a controller or a publish/subscribe system. As another example, a corresponding page may be determined by requesting another component to provide the corresponding URL.

A number of implementations have been described. Nevertheless, it will be understood that various modifications may be made. For example, various operations in the disclosed processes may be performed in different orders or in parallel. Accordingly, other implementations are within the scope of the following claims.

What is claimed is:

1. A computer-implemented method comprising:
    transmitting a voice-extensible markup language ("VXML") page from a server to a second-modality gateway, the VXML page embedded with a no-input tag, the no-input tag specifying code to execute at the second-modality gateway to retrieve a server page if user input is not received for a specified amount of time;

receiving a request for a hyper-text markup language ("HTML") page from a first-modality gateway at the server;

transmitting the HTML page from the server to the first-modality gateway;

noting a state change of the first-modality gateway, at the server;

determining a VXML page corresponding to the HTML page, at the server;

updating the server page with information corresponding to the determined VXML page;

transmitting an update request from the second-modality gateway to the server;

receiving the update request at the server;

sending the determined VXML page to the second-modality gateway; and receiving the determined VXML page at the second-modality gateway, thereby synchronizing the first-modality gateway with the second-modality gateway.

2. The method of claim 1, wherein the information corresponding to the determined VXML page includes a Universal Resource Locator ("URL").

3. The method of claim 1, wherein transmitting the update request from the second-modality gateway to the server further includes having the second-modality gateway wait for a specified amount of time before transmitting the update request.

4. The method of claim 1, wherein transmitting the update request from the second-modality gateway to the server further includes transmitting the update request only if user input is not detected within a specified amount of time.

5. The method of claim 1 further comprising receiving an additional user input through the first-modality gateway or the second-modality gateway after the update request is received at the server but before the first-modality gateway or the second-modality gateway are synchronized.

6. The method of claim 5 further comprising assigning priority to additional user input from the first-modality gateway or the second-modality gateway.

7. The method of claim 6, wherein the priority is assigned based on a first-input basis.

8. The method of claim 6, wherein the priority is assigned by default to either the first-modality gateway or the second-modality gateway.

\* \* \* \* \*